FIELD-EFFECT TRANSISTOR WITH IMPROVED TRANSMISSION ADMITTANCE

Filed Aug. 28, 1964

INVENTOR.
ADRIANUS J.W.M. VAN OVERBEEK
BY
Frank R. Trifari
AGENT

United States Patent Office 3,358,198
Patented Dec. 12, 1967

3,358,198

FIELD-EFFECT TRANSISTOR WITH IMPROVED TRANSMISSION ADMITTANCE

Adrianus Johannes Wilhelmus Marie Van Overbeek, Emmasingel, Eindhoven, Netherlands, assignor to North American Philips Company, Inc., New York, N.Y., a corporation of Delaware Filed Aug. 28, 1964, Ser. No. 392,699
Claims priority, application Netherlands, Aug. 30, 1963, 297,331
9 Claims. (Cl. 317—235)

ABSTRACT OF THE DISCLOSURE

A field-effect transistor having a modified structural relationship over only a small part of a transverse dimension of the current flow region between the source and drain electrodes and underlying the gate electrode to provide a transmission admittance characteristic which is more uniform over a larger range of gate voltages. Various forms of construction are illustrated and described for achieving this modified transmission admittance characteristic. This abstract is not to be considered limitative of the scope of the invention herein described.

The invention relates to a field-effect transistor comprising a semi-conductor body having at least three electrodes two of which, referred to as source and drain electrodes, determine a current region in an intermediate part of the body, a barrier layer electrode, hereinafter referred to as gate electrode, being provided on the surface of the said current region to influence the impedance between the source and the drain electrodes. The invention further relates to a device including such a field-effect transistor for amplifying electric oscillations.

In a conventional practical embodiment of a field-effect transistor the semi-conductor body has the shape of a rod of circular or rectangular cross-section on the ends of which the source and drain electrodes are provided, the gate electrode being in the form of a ring encircling the central portion of the rod. In another known practical embodiment the source electrode (or the drain electrode) and the gate electrode are arranged on a semi-conductor disc in the form of concentric rings encircling the drain electrode (or the source electrode). In the said embodiments the junction of the gate electrode is generally a pn junction and the gate electrode is operated in the reverse direction so that the depletion layer interrupts the current region to a greater or lesser extent depending upon the value of the reverse voltage.

The said field-effect transistors are also known in another embodiment as thin-film transistors in which the semi-conductor body is provided on a support in the form of a thin semi-conductor layer, for example, of cadmium sulfide or silicon. The source electrode and the drain electrode may be provided on the semi-conductor layer in the form of two slightly spaced parallel layers, the gate electrode evenly covering the surface of the current region produced between the said electrodes. In such thin-film transistors the gate electrode generally consists of a thin insulating layer which is connected to the semi-conductor layer and produces the junction effect, and a superposed metal layer. In this embodiment the electrodes may alternatively be provided as concentric layers. A field-effect transistor having a gate electrode the junction of which is formed by an insulating layer may be designed for operation in the so-called depletion (Erschöpfung) mode in which the charge carriers are drawn off by the junction of the gate electrode and/or for operation in the so-called enrichment (Anreicherung) mode in which there is applied to the gate electrode a voltage such that the number of charge carriers in the current region is increased.

One of the recognitions on which the invention is based is that by modifying the design of the known field-effect transistors of the aforementioned kind an amplifier element is readily obtained which enables not only weak input signals to be handled with a high degree of amplification but also strong input signals to be handled with a small degree of amplification in a particularly efficient manner by varying the gate electrode voltage. Although the rapid development of the semi-conductor technology which has been in progress for a long time has produced in addition to field-effect transistors a large variety of other semi-conductor amplifying elements, still no semi-conductor element is available which may readily be made such as to be particularly suitable for uses in which the aforementioned properties are particularly important, for example, in automatic gain control in a receiver, without having other important disadvantages. In the known transistors the decrease of amplification as a function of a control voltage decreases too rapidly, which provides difficulty in controlling the amplification and also in handling strong input signals at a lower degree of amplification without excessive distortion. In the known field-effect transistors in which the gate electrode influences the admittance substantially uniformly over its entire transverse dimension (i.e. its dimension at right angles to the direction of the current) and the current region, this means that in the characteristic curve showing the variation of the drain electrode current as a function of the gate electrode voltage the part corresponding to a small degree of amplification comprises only a very limited range of gate electrode voltages and is strongly curved.

A field-effect transistor of the kind described in the preamble may simply be considerably improved in this respect if in accordance with the invention the current region between the source and the drain electrodes and the gate electrode is so designed and provide that the gate electrode through a preferably small part of its transverse dimension in the associated preferably small part of the current region extending from the source electrode to the drain electrode, which region hereinafter will be referred to as matching region, causes a variation in the transmission admittance between the source and drain electrode which differs from the transmission admittance variation through an equal part of the remaining transverse dimension of the gate electrode in the associated other part of the current region, the arrangement being such that due to the difference in the transmission admittance variation in the said matching region the part of the characteristic curve corresponding to a small degree of amplification is spread over a considerably larger range of gate electrode voltages.

Thus the control range at a lower degree of amplification is decreased while in addition this part of the characteristic is given a more uniform variation and hence is more suitable for handling strong signals with a small degree of amplification without excessive distortion.

The term "current region" is used herein to denote the portion of the semi-conductor body traversed by the current between the source and drain electrodes at the various operating voltages. The current region generally coincides with the portion of the body situated geometrically between the most closely adjacent parts of the source electrode and the drain electrode, with the understanding that at the edges of the electrodes the region may be slightly extended by edge effects. The term "the part of the current region associated with the gate electrode through part of the transverse dimension of the gate electrode" is used herein to denote that portion of the current region between the source and drain electrodes the admittance of which is influenced by the junction of the relevant portion of the gate electrode, for example, in the case of a field-effect transistor operated in the depletion mode that portion of the entire current region between the source and drain electrodes which in operation will be interrupted by the junction of the relevant portion.

The transmission admittance of such a portion of the current region, which portion extends between the source and drain electrodes, is usually defined as $$\left(\frac{\Delta i_d}{\Delta V_g}\right)V_{sd}$$

where $\Delta i_d$ represents the variation of the drain electrode current contribution $i_d$ of the relevant portion of the current region produced by a variation $\Delta V_g$ of the gate electrode potential $V_g$ with respect to the potential of the source electrode with a constant voltage difference $V_{sd}$ between the source and drain electrodes. The magnitude of the said transmission admittance and its variation as a function of the gate electrode voltage are determined by the construction of the respective portion of the gate electrode and the associated portion of the current region.

Hence the variation of the transmission admittance $$\left(\frac{\Delta i_d}{\Delta V_g}\right)V_{sd}$$

in the matching range is one of the factors determining the variation of the overall transmission admittance $$\left(\frac{\Delta I_d}{\Delta V_g}\right)V_{sd}$$

where $\Delta I_d$ represents the variation of the overall drain electrode current of the entire current region, and this overall transmission admittance is proportional to the amplification factor of the field-effect transistor. Consequently in a field-effect transistor in accordance with the invention the desired improvement is obtainable at a low degree of amplification by making the matching region and the associated portion of the gate electrode different from the remainder in a sense such that the variation of the transmission transmittance thereof as a function of the gate electrode voltage is more uniform and still provides an essential contribution to the variation of the overall transmission admittance in the range of gate electrode voltages in which the remainder of the current region already provides too low a contribution.

The satisfactory properties of a field-effect transistor in the portion of the characteristic corresponding to a high amplification factor may largely be retained if, as preferably is the case, the matching region and the associated portion of the gate electrode form only a small fraction of the whole. Some of the factors determining the choice of the proportions of the said portion of the gate electrode and the associated matching region relative to the whole are the magnitude of the difference in admittance between the matching region and the remainder of the current region, the desired expansion of the characteristic at a low degree of amplification and the permissible influence on the portion of the characteristic at a high degree of amplification. However, generally the matching region and the corresponding transverse dimension of the gate electrode will not be chosen greater than one third of the overall transverse dimension, preferably even smaller than one tenth of the overall transverse dimension.

The steps taken to produce the desired difference in the variation of the transmission admittance within the matching region will be different according to whether the respective field-effect transistor is to be operated in the depletion mode or in the enrichment mode.

In the case of a field-effect transistor intended to be operated at least partially in the depletion mode, to which the invention is preferably applied, the said difference in the variation of the transmission admittance is obtained by the fact that the interrupting effect of the junction of the gate electrode in the matching region is retarded with respect to that in the remainder of the current region. The term "retarded interrupting effect of the matching region" is used herein to mean that in the range of gate electrode voltages in which the remainder of the current region is considerably interrupted, at the same potential of the supply lead of the gate electrode, the interrupting effect in the matching region has not progressed as fast as in the remainder of the current region, i.e. has progressed a smaller distance in the longitudinal direction between the source and drain electrodes and/or less deeply in the cross-section of the current region than in the said remainder of the current region.

In the case of a field-effect transistor for operation in the enrichment mode the said difference in the variation of the transmission admittance is obtained by the fact that the enriching effect in the matching region is advanced with respect to that in the remainder of the current region, i.e. the enriching effect (increase in the number of charge carriers) already commences at gate electrode voltages at which the remainder of the current region still undergoes an appreciably smaller enrichment. The desired difference in the variation of the transmission admittance between the matching region and the remainder of the current region is obtainable by making the gate electrode and/or the current region at the area of the said gate electrode in the matching region different from the remainder of the gate electrode and the associated current region. Thus, for example, a retarded interrupting effect in the matching region may be obtained by making the thickness of the semi-conductor body (i.e. the dimension at right angles to the gate electrode) greater in the matching region than in the remainder of the current region with the result that only at a higher reverse voltage can the matching region be interrupting (pinched-off) in the same degree as the remainder. Alternatively the junction effect and hence the interrupting or enriching effect may be influenced by making the variation in the concentration of impurities determining the conduction in the matching region different from that in the remainder of the current region. As a further alternative, a local variation in the electrode spacing between the source electrode and the drain electrode and a simultaneous increase in the distance by which the gate electrode is spaced from the source electrode or drain electrode may be utilised.

The difference in the variation of the transmission admittance is obtained by making that portion of the transverse dimension of the gate electrode which corresponds to the matching region different from the remainder, in which case the other parameters, such as the electrode spacing between the source electrode and the drain electrode, the thickness of the semi-conductor layer and the variation in the concentration of impurities, may advantageously be maintained constant throughout the entire transverse dimension. In the case of a field-effect transistor intended to be used, at least partially, in the depletion mode the said difference may simply be constituted by a reduction of the width of the gate electrode at the area of the matching region.

The retardation of the interruption may be increased if the portion of smaller cross-section of the gate electrode is situated nearer the source electrode so that at the same time the spacing between the gate electrode and the drain electrode is increased in the matching region, although it may for other reasons be desirable to locate the portion of smaller cross-section nearer the drain electrode. In another preferred embodiment the gate electrode is interrupted through a very small part of its entire transverse dimension by a thin gap, for example, at the centre or at the edge of its transverse dimension. The said part must in this case be so small, however, that at higher values of the gate electrode voltage the adjoining edge or edges of the remainder of the gate electrode are capable of interrupting the current region under the gap with a certain retardation. The separated portions and the gate electrode are interconnected by a supply lead. In another preferred embodiment of the invention the retardation of the interrupting effect is achieved by locally increasing the thickness of the insulating layer of the gate electrode in the matching region. In a field-effect transistor intended for operation in the enrichment mode an advanced enriching effect is preferably achieved by a local reduction of the thickness of the insulating layer of the gate electrode in the matching region. The aforementioned embodiments, which relate to local differences in the construction of the gate electrode through its transverse dimension, have the additional advantage that they are particularly effective in improving the characteristic curve and yet may be manufactured very simply, especially if, as generally is the case, the transverse dimension of the gate conductor greatly exceeds the spacing between the source and drain electrodes.

Although the invention may be used to advantage in many embodiments of the field-effect transistor of the kind described in the preamble, it is preferably used in field-effect transistors of the kind in which the semiconductor body is provided in the form of a semiconductor layer on a substantially insulating support, the various electrodes being secured to the semi-conductor layer in the form of layers in a manner known for thin film transistors. Particularly in such field-effect transistors in the manufacture of which deposition from the vapour phase or photographic processes are used the steps in accordance with the invention may be accomplished by small variations in the manufacturing process.

The invention also relates to the use of a field-effect transistor in accordance with the invention in a device for amplifying electric oscillations. According to the invention such a device is characterized by the additional provision of means by which the degree of amplification of the field-effect transistor may be altered by variation of the gate electrode voltage, as is the case, for example, in known circuits for automatic gain control in receivers.

In order that the invention may readily be carried into effect, embodiments thereof will now be described, by way of example, with reference to the accompanying diagrammatic drawings, in which.

Figure 1:
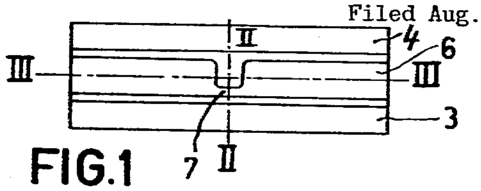
FIGS. 1, 2 and 3 are a top plan view and two sectional views respectively of an embodiment of a field-effect transistor in accordance with the invention.
Figure 2:
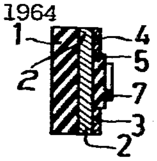
Figure 3:
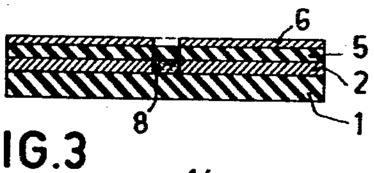

The field-effect transistor for operation in the depletion mode shown in FIGS. 1, 2 and 3 comprises an insulating support 1 coated with a thin semiconductor layer 2 consisting, for example, of n-type silicon having a thickness of, say, about 10$\mu$. A source electrode 3 and a drain electrode 4 in the form of parallel extending metallic layers are provided on the semiconductor layer 2 through a distance of about 3 mm. so as to be spaced from one another by about 20$\mu$. The current region in the semiconductor layer lies between the two electrodes 3 and 4 and on this region is provided a gate electrode comprising an insulating layer 5 about 0.1$\mu$ thick and a metallic contact layer 6. The transverse dimension of the gate electrode (5, 6), i.e. the dimension of the gate electrode, extending at right angles to the direction of the current, along the line III—III is also 3 mm.

As FIGS. 1, 2 and 3 show diagrammatically, the gate electrode (5, 6) is modified through a small part of its transverse dimension, the difference consisting in that through a distance of about 100$\mu$ the width of the gate electrode layer 6 is reduced to about 4$\mu$. If desired, the insulating layer 5 of the gate electrode may locally have a similar narrow part; however, as is shown in FIG. 2, it may be of constant width because the junction effect remains substantially restricted to the portion covered by the metal layer 6. The residual narrow portion 7 of the gate electrode 6 lies nearer the source electrode 3 so that the spacing between the gate electrode layer and the drain electrode 4 is increased along the narrow portion 7. Thus a portion 8 of the semiconductor layer 2, which portion extends from the source electrode 3 to the drain electrode 4 and is associated with the narrow portion 7 of the gate electrode, forms the matching region which is of very small size compared with the entire current region.

Owing to the said difference in construction of the portion 7 of the gate electrode the variation of the transmission admittance of the associated portion of the transistor differs from that in a portion of equal size of the remainder of the transistor. In the matching region 8 the gate electrode portion (5, 7) exhibits a retarded interrupting effect of the junction. With the same potential at the gate electrode (6, 7), in the matching region 8 the junction of the gate electrode will be active only through a shorter distance in the direction between the source electrode 3 and the drain electrode 4 and will also penetrate to a smaller depth into the semi-conductor layer owing to the provision of the narrow portion. This effect is increased as the residual width of the gate electrode along the narrow portion 7 is smaller and even is smaller than the thickness of the associated semiconductor layer. In this case the retardation of the interrupting effect may be further increased by the gate electrode 6 being spaced by a greater distance from the drain electrode 4 along the narrow portion 7. As is known, in a field-effect transistor operated in the depletion mode the interrupting effect is a maximum in the proximity of the drain electrode 4 because at this area the potential difference between the gate electrode and the current region is increased due to the increase of the voltage in the current region from the source electrode 3 towards the drain electrode 4.

Figure 4:
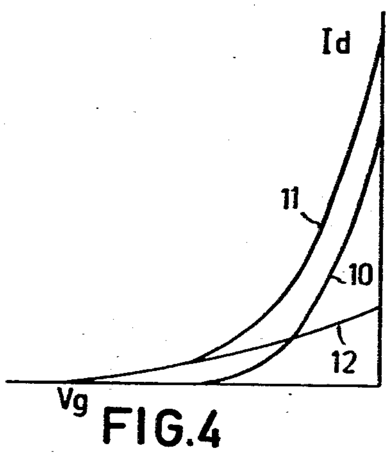
FIG. 4 is a graph of the variation of a characteristic of a field-effect transistor in accordance with the invention compared to that of a known field-effect transistor.

In FIG. 4 the gate electrode voltage $V_g$ and the drain electrode current $I_d$ are plotted linearly in arbitrary units along the horizontal axis and the vertical axis respectively. The embodiment described with reference to FIGS. 1, 2 and 3 relates to a field-effect transistor having an n-type current region so that for operation in the depletion mode a negative potential is applied to the gate electrode with respect to the source electrode to obtain interruption. The source electrode may be, for example, at earth potential and the drain electrode at a positive potential. The curve 10 shows the $I_d$–$V_g$ characteristic of a known transistor. The slope of this characteristic $$\left(\frac{\Delta I_d}{\Delta V_g}\right)$$

is the transmission admittance, which is a measure of the degree of amplification. It will be evident that at comparatively low values of $V_g$ this transmission admittance (degree of amplification) has a substantially constant high value and at higher negative values of $V_g$ greatly decreases in the curved part of the characteristic in a comparatively small range of gate electrode voltages $V_g$. The curve 11 is the $I_d$–$V_g$ characteristic of a field-effect transistor in accordance with the invention, which curve is particularly distinguished from the aforementioned curve in that the region of lower transmission admittance is spread over an appreciably larger range of gate electrode voltages owing to the retarded interrupting effect of the matching region while furthermore the curve 11 in this range is more even and less curved. The characteristic curve 11 may be considered as made up from the conritibution of the matching region and the contribution of the remainder of the current region, the remainder of the current region having a characteristic as represented by the curve 10 owing to the fact that this current region is built exactly like that of the known transistor. However, owing to its comparatively small size and its retarded interrupting effect the matching region has another partial characteristic, as indicated by the curve 12. At higher negative values of the gate electrode potential, at which the remainder of the current region already is appreciably interrupted, the overall current variation is substantially determined by the matching region and hence the curves 11 and 12 substantially coincide in this voltage range. At smaller negative values of $V_g$, however, the contribution of the remainder of the current region predominates and the contribution of the matching region remains comparatively small owing to its comparatively small size so that the form of the curve 10 will be maintained to a considerable extent in the said portion of the characteristic 11.

Figure 5:
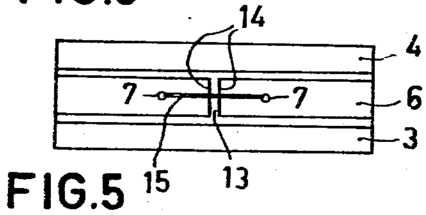
FIG. 5 is a top plan view of an embodiment of a field-effect transistor in accordance with the invention slightly modified with respect to that shown in FIGS. 1, 2 and 3.

FIG. 5 is a plan view of another advantageous construction of a field-effect transistor in accordance with the invention which differs from that shown in FIGS. 1, 2 and 3 only in that the gate electrode for a small part of its transverse dimension is entirely interrupted by a narrow gap 13. This gap 13 is made so narrow that at higher values of the gate electrode potential edges 14 of the gate electrode 6 are capable of interrupting the matching region situated under the gap with a certain retardation. The gap width may, for example, be a few microns while otherwise the transistor may be equal to that shown in FIGS. 1, 2 and 3. The two portions of the gate electrode are interconnected by a common supply lead 15.

Figure 6:
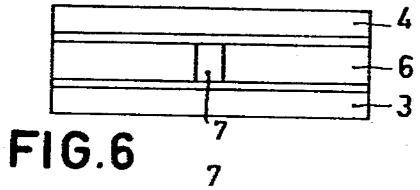
FIGS. 6 and 7 are a top plan view and a cross-sectional view respectively of another embodiment of a field-effect transistor in accordance with the invention.
Figure 7:
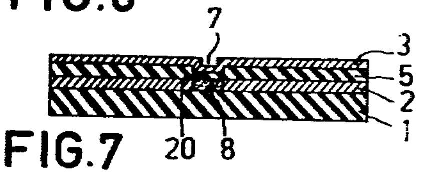

FIGS. 6 and 7 are a top plan view and a sectional view respectively of an embodiment of a field-effect transistor in accordance with the invention for operation in the enrichment mode. The component parts of this transistor corresponding to those of FIGS. 1, 2 and 3 are designated by the same reference numerals. This embodiment in accordance with the invention differs from the known construction in that through a small part (7) of the transverse dimension of the gate electrode (5, 6) the insulating layer 5 is made thinner so that the local capacitance of the insulating layer 5 is increased and hence in this part at the same potential across the gate electrode layer (6, 7) an advanced enriching effect will take place. This results in a form of the $I_d$–$V_g$ characteristic analogous to that shown in FIG. 4 with the difference that the entire characteristics are shifted towards positive values of $V_g$ because with operation in the enrichment mode in the case of an n-type current region positive potentials are applied to the gate electrode. The thickness of the insulating layer 20 may, for example, be one half of the thickness of the remainder of the layer 5.

Figure 8:
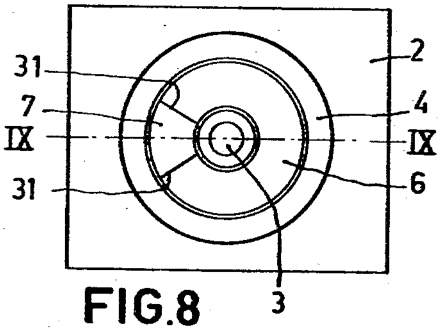
FIGS. 8 and 9 are a top plan view and a cross-sectional view respectively of a concentric construction of a field-effect transistor in accordance with the invention.
Figure 9:
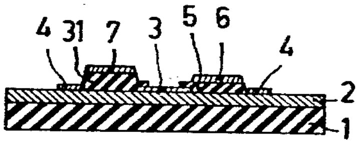

FIGS. 8 and 9 show by way of example a concentric construction of a field-effect transistor in accordance with the invention for operation in the depletion mode in top plan view and in cross section taken on the broken line IX—IX. This construction differs from that of FIGS. 1, 2 and 3 in that the gate electrode layer 7 and the drain electrode layer 4, in this sequence, are arranged in known manner concentrically about the source electrode 3 on the semi-conductor layer 2. The source electrode 3 and the drain electrode 4 may be interchanged. The transverse dimension of the gate electrode in this case is the circumference of a circle. Through part of this circle, namely the part 7 bounded by radii 31, the gate electrode (5, 6) is constructed differently in that, as FIG. 9 shows, the insulating layer 5 locally has a thicker portion 31 under the part 7 of the gate electrode layer. Consequently the associated sector-shaped part of the entire current region undergoes a restarded interrupting effect. The semiconductor layer 2, may for example, consist of an n-type CdS layer 0.1μ thick.

Figure 10:
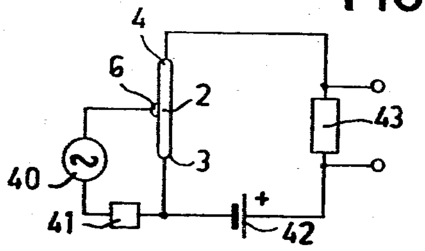
FIG. 10 is the circuit diagram of a device in accordance with the invention including a field-effect transistor in accordance with the invention.

FIG. 10 is an embodiment of a circuit diagram of a device in accordance with the invention for amplifying electric oscillations. The field-effect transistor in accordance with the invention is indicated by a semiconductor body 2 which may be of n-type, a source electrode 3, a drain electrode 4 and a gate electrode 6. Between the source electrode 3 and the gate electrode 6 are connected an input signal source 40 and a device 41 by means of which the degree of amplification of the transistor may be varied by variation of the potential of the gate electrode 6, for example, a battery having a variable voltage and having its negative terminal connected to the gate electrode 6 or an impedance through which the control voltage is applied in a manner known for automatic gain control. In the output circuit the drain electrode 4 is given a positive potential with respect to the source electrode 3 by means of a voltage source 42, the output circuit further including a load impedance 43 from which the amplified signal may be taken. If desired, the output of the transistor may be connected to the input of a junction transistor or to the input of a further field-effect transistor.

Finally it should be noted that for a person skilled in the art many variations are possible without departing from the scope of the invention. For example, in the embodiments shown one or more of the electrode layers, for example, the gate electrode (5, 6) may be provided on the other side of the semi-conductor layer 2. While, for example, in FIGS. 1 to 3 and 5 to 7 the semiconductor layer 2 and the support 1 extend only under and geometrically between the source electrode 3 and the drain electrode 4, the semiconductor layer 2 and the support 1 may be greater in extent, the field-effect transistor in accordance with the invention being located at some area of their surface. In this case the current region at its edges will extend slightly further into the semiconductor layer and the gate electrode (5, 6) while otherwise the same will be given a greater transverse dimension to enable it to influence also the remainder of the current path. If desired, the insulating layer 5 may partially cover the source and drain electrode layers 3 and 4, as may the gate electrode layer 6 because the insulating layer prevents short-circuits. The matching region and the associated portion of the gate electrode need not be provided at the centre of the current region but may be shifted at will through the transverse dimension of the current range up to the edge. The support 1 of the semiconductor layer may consist of a substantially insulating high-resistance or intrinsic semiconductor, for example, of substantially intrinsic silicon, on which the semiconductor layer, which may consist of germanium or silicon having a lower specific resistance, is provided. To produce a retarded interrupting effect or an advanced enriching effect the matching region and the associated portion of the current region may be different from the remainder of the current region and the remainder of the gate electrode in another way than is described, by way of example, with reference to the figures. Thus, for example, to retard the interruption or to advance the enrichment use may be made of a local difference in the electrode spacing between the source and drain electrodes, of a difference in the variation of the concentration of the impurities determining the conduction in the semiconductor layer, and of a difference in thickness of the semiconductor layer. The enrichment may, for example, be influenced by the fact that the metal layer of the gate electrode locally consists of a material having a different contact potential. The invention may be analogously applied to field-effect transistors in which the junction consists in known manner of a pn-junction. In a transistor of the kind shown in FIGS. 1, 2 and 3, for example, the insulating layer 5 may be replaced by a p-type semiconductor, in which case both the layer 5 and the metal layer have narrow portions, or the semiconductor layer 2 is given a thicker portion or portions. The semiconductor body need not be in the form of a semiconductor layer on a support but may alternatively be a self-supporting semiconductor body, for example, a rod on the ends of which the source and drain electrodes are provided while the middle portion is surrounded by an annular gate electrode forming a pn junction with the rod. In this case the interrupting effect may be reduced along the periphery of the annulus (transverse dimension of the gate electrode), for example, by locally removing the gate electrode for an appreciable part by a thin gap extending in the direction from the source electrode to the drain electrode. In the current region the n-type semiconductor material may be replaced by p-type semiconductor material, in which case the polarity of the voltages naturally is reversed and hence the characteristic shown in FIG. 4 is changed in a sense such that it is a mirror image with respect to the $I_d$ axis. In the field-effect transistor in accordance with the invention two or more gate electrodes may be provided, in known manner, side by side on the current region between the source and drain electrodes and staggered with respect to each other in the direction from the source electrode to the drain electrode, the additional gate electrodes being, for example, at a substantially constant potential in order to increase the impedance in the current path so as to be capable of producing a screening effect between the first gate electrode and the drain electrode. If desired, the said additional gate electrodes may be differently constructed in the matching region. Finally it should be noted that the field-effect transistor in accordance with the invention may be combined with other circuit elements, for example, further field-effect transistors in a semiconductor layer to form a solid circuit.

What is claimed is:

1. A field-effect transistor comprising a wafer-like body of semiconductive material, elongated source and drain electrodes contacting closely spaced portions of the semiconductive body and extending generally in the same direction to define in the semiconductor body and extending between the nearest edges of the electrodes a current region in which majority carrier current flows from the source to the drain electrodes, said current region having a short length in the current flow direction and a wider transverse dimension, a gate electrode connected to said body at a surface thereof and having at least a portion overlying said current region and forming a barrier layer with said body and capable when a voltage is applied thereto of modifying the current flow between the source and drain electrodes through the current region to produce a characteristic curve of the drain current as a function of the gate voltage whose slope is defined as the transmission admittance of the transistor, the gate electrode extending substantially parallel to the semiconductive body over most of the transverse dimension of the current region to define a certain transmission admittance, and means for modifying the structural relation between said gate electrode and semiconductive body over only a small part of the transverse dimension of the current region to define a different transmission admittance whereby the overall transmission admittance of the transistor is rendered more uniform over a larger range of gate voltages.

2. A field-effect transistor as set forth in claim 1 wherein the modifying means extends over less than one-tenth of the overall transverse dimension of the current region.

3. A circuit comprising the field-effect transistor defined in claim 1 and including means for applying a variable potential to the gate electrode to vary the degree of amplification of the transistor.

4. A field-effect transistor comprising a wafer-like body of semiconductive material, elongated source and drain electrodes contacting closely spaced portions of the semiconductive body and extending generally in the same direction to define in the semiconductor body and extending between the nearest edges of the electrodes a current region in which majority carrier current flows from the source to the drain electrodes and generally perpendicular to the electrodes' longitudinal dimension, said current region having a short length in the current flow direction and a wider transverse dimension extending generally parallel to the elongated electrodes, an elongated gate electrode connected to said body at a surface thereof and having at least a portion overlying said current region and forming a barrier layer with said body and capable when a voltage is applied thereto of modifying the current flow between the source and drain electrodes through the current region to produce a characteristic curve of the drain current as a function of the gate voltage whose slope is defined as the transmission admittance of the transistor, the gate electrode over most of the transverse dimension of the current region extending substantially parallel to the semiconductive body and having a given length in the current flow direction to define a certain transmission admittance, and said gate electrode over only less than one-tenth of the overall transverse dimension of the current region having a significantly shorter length than said given length to define a different transmission admittance whereby the overall transmission admittance of the transistor is rendered more uniform over a larger range of gate voltages.

5. A transistor as set forth in claim 4 wherein said shorter portion of the gate electrode is closer to the source electrode than to the drain electrode.

6. A transistor as set forth in claim 4 wherein the shorter portion of the gate electrode is reduced to zero forming a gap in the gate electrode, and means are provided interconnecting the divided gate electrode portions.

7. A field-effect transistor comprising a wafer-like body of semiconductive material, elongated source and drain electrodes contacting closely spaced portions of the semiconductive body to define in the semiconductor body and extending between the nearest edges of the electrodes a current region in which majority carrier current flows from the source to the drain electrodes and generally perpendicular to the electrodes' longitudinal dimension, said current region having a short length in the current flow direction and a wider transverse dimension extending generally parallel to the elongated electrodes, an insulating layer on the body and overlying the current region, a gate electrode on the insulating layer and having at least a portion overlying said current region and capable when a voltage is applied thereto of modifying the current flow between the source and drain electrodes through the current region to produce a characteristic curve of the drain current as a function of the gate voltage whose slope is defined as the transmission admittance of the transistor, the insulating layer underlying the gate electrode having over most of the transverse dimensions of the current region a given thickness to define a certain transmission admittance, and said insulating layer underlying the gate electrode over only less than one-tenth of the transverse dimension of the current region having a different thickness than said given thickness to define a different transmission admittance whereby the overall transmission admittance of the transistor is rendered more uniform over a larger range of gate voltages.

8. A transistor as set forth in claim 7 wherein the last-mentioned portion of the insulating layer is thinner than the remainder placing the overlying portion of the gate electrode closer to the semiconductive body.

9. A transistor as set forth in claim 7 wherein the last-mentioned portion of the insulating layer is thicker than the remainder placing the overlying portion of the gate electrode further from the semiconductive body.

References Cited

UNITED STATES PATENTS

| | | | |
|---|---|---|---|
| 2,869,055 | 1/1959 | Noyce | 317—235 |
| 2,900,531 | 8/1959 | Wallmark | 307—88.5 |
| 2,951,191 | 8/1960 | Herzog | 317—235 |
| 3,206,670 | 9/1965 | Atalla | 323—93 |

JAMES D. KALLAM, *Primary Examiner.*

JOHN W. HUCKERT, *Examiner.*

R. F. SANDLER, *Assistant Examiner.*